(12) United States Patent
Kwon et al.

(10) Patent No.: US 11,550,754 B2
(45) Date of Patent: Jan. 10, 2023

(54) ELECTRONIC APPARATUS AND CONTROL METHOD THEREOF

(71) Applicant: Samsung Electronics Co., Ltd., Suwon-si (KR)

(72) Inventors: Sun-beom Kwon, Suwon-si (KR); Ki-chul Kim, Seoul (KR); Han-nam Kim, Gunpo-si (KR); Su-jin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/375,710

(22) Filed: Jul. 14, 2021

(65) Prior Publication Data

US 2021/0342303 A1    Nov. 4, 2021

Related U.S. Application Data

(62) Division of application No. 16/190,738, filed on Nov. 14, 2018, now Pat. No. 11,074,217.

(30) Foreign Application Priority Data

Jan. 23, 2018  (KR) .......................... 10-2018-0008141

(51) Int. Cl.
*G06F 16/16* (2019.01)
*H04N 5/232* (2006.01)
(Continued)

(52) U.S. Cl.
CPC ............ *G06F 16/164* (2019.01); *G06V 20/20* (2022.01); *G06V 20/35* (2022.01); *H04N 1/2112* (2013.01);
(Continued)

(58) Field of Classification Search
CPC ....... G06F 16/164; G06F 16/58; G06V 20/20; G06V 20/35; H04N 1/2112;
(Continued)

(56) References Cited

U.S. PATENT DOCUMENTS 8,334,898 B1    12/2012    Ryan et al.
9,208,171 B1    12/2015    Cotting et al.
(Continued)

FOREIGN PATENT DOCUMENTS

CN    1768389 A    5/2006
CN    101883316 A    11/2010
(Continued)

OTHER PUBLICATIONS

International Search Report and Written Opinion dated May 14, 2019, issued in International Patent Application No. PCT/KR2019/000628.

(Continued)

*Primary Examiner* — Amy R Hsu
(74) *Attorney, Agent, or Firm* — Jefferson IP Law, LLP

(57) ABSTRACT

An electronic apparatus is provided. The electronic apparatus includes a camera, a storage, and a processor configured to store an image photographed by the camera and metadata of the image in the storage, the processor is further configured to identify whether first information related to the image is obtainable, based on the first information not being obtainable, generate metadata related to the first information based on second information, and store the generated metadata as metadata of the image.

5 Claims, 13 Drawing Sheets

(51) Int. Cl.
*H04N 1/21* (2006.01)
*G06V 20/20* (2022.01)
*G06V 20/00* (2022.01)

(52) U.S. Cl.
CPC ............... *H04N 5/232933* (2018.08); *H04N 2201/0084* (2013.01)

(58) Field of Classification Search
CPC ....... H04N 2201/0084; H04N 5/23293; H04N 5/232933
See application file for complete search history.

(56) References Cited

U.S. PATENT DOCUMENTS

| | | | |
|---|---|---|---|
| 9,471,603 | B2 | 10/2016 | Kim et al. |
| 9,547,647 | B2* | 1/2017 | Badaskar ................. G06F 16/43 |
| 2003/0126212 | A1 | 7/2003 | Morris et al. |
| 2008/0306921 | A1 | 12/2008 | Rothmuller et al. |
| 2009/0327229 | A1 | 12/2009 | O'Connor et al. |
| 2010/0277365 | A1 | 11/2010 | Ha et al. |
| 2011/0096165 | A1 | 4/2011 | Zeng et al. |
| 2012/0069215 | A1* | 3/2012 | Park ..................... H04N 9/8233 348/E5.031 |
| 2013/0093788 | A1 | 4/2013 | Liu et al. |
| 2013/0275164 | A1 | 10/2013 | Gruber et al. |
| 2015/0186425 | A1* | 7/2015 | Chang ..................... G06F 16/58 707/728 |
| 2017/0048170 | A1 | 2/2017 | Smullen et al. |
| 2017/0069315 | A1 | 3/2017 | Chung et al. |
| 2017/0091154 | A1 | 3/2017 | Eppolito et al. |

FOREIGN PATENT DOCUMENTS

| | | |
|---|---|---|
| CN | 105653154 A | 6/2016 |
| JP | 4162074 B2 | 10/2008 |
| JP | 4434972 B2 | 3/2010 |
| JP | 2015-133139 A | 7/2015 |
| KR | 10-2012-0029860 A | 3/2012 |
| KR | 10-2015-0019493 A | 2/2015 |
| KR | 10-1659097 B1 | 9/2016 |
| KR | 10-2017-0030297 A | 3/2017 |
| KR | 10-1712296 B1 | 3/2017 |
| KR | 10-1796607 B1 | 11/2017 |
| WO | 2004/090903 A1 | 10/2004 |
| WO | 2009/128021 A1 | 10/2009 |

OTHER PUBLICATIONS

Extended European Search Report dated May 12, 2020, issued in European Patent Application No. 19743301.4-1231.
Chinese Office Action dated Nov. 4, 2020, issued in Chinese Application No. 201980005734.X.
Chinese Office Action dated Jul. 2, 2021, issued in Chinese Patent Application No. 201980005734.X.
European Examination Report dated Nov. 30, 2021, issued in European Patent Application No. 19743301.4-1231.
Korean Office Action dated Dec. 17, 2021, issued in Korean Patent Application No. 10-2018-0008141.
Chinese Notice of Allowance dated Apr. 2, 2022, issued in Chinese Patent Application No. 201980005734.X.

* cited by examiner

ELECTRONIC APPARATUS AND CONTROL METHOD THEREOF

CROSS-REFERENCE TO RELATED APPLICATION(S)

This application is a divisional application of prior application Ser. No. 16/190,738, filed on Nov. 14, 2018, which claimed priority under 35 U.S.C. § 119(a) of a Korean patent application number 10-2018-0008141, filed on Jan. 23, 2018, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus capable of retrieving a desired image based on tag information and a controlling method thereof.

2. Description of the Related Art

With the development of computer technology, a user can easily search for a desired content through a storage device such as a smartphone. Typically, the user searches for data by inputting a keyword related to data into a search field, or selecting one of keywords provided by a system of a smartphone. For example, when data that the user wishes to find is an image, the smartphone may perform image search based on information tagged to the image. The information tagged to the image may be information on a shooting time, a shooting location, etc. of the image. Recently, a technique for tagging recognition information of a specific object or a specific person in an image to the image has been widely used.

Users need to retrieve and collect desired information, but a problem lies in that the users have to review large numbers of keywords for selecting the information, or it costs too much time to select the information out of a large amount of information provided as search results.

Particularly, some images without tagging information, for example, images without tagging information of a shooting location, a shooting time, etc. are often missed in the search results.

In addition, large numbers of images provided as the search results according to the keyword input by the user make the user search for the information again with an additional keyword. Therefore, it is not easy for the user to search for a desired image quickly and conveniently.

Accordingly, there has been a growing demand for a method for retrieving an image accurately without omission and a search interface that can quickly and conveniently categorize and screen search results.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus capable of providing a search interface for retrieving an image according to user's intention based on context information of an image, and providing an image the user wants quickly and conveniently, and a controlling method thereof.

In accordance with an aspect of the disclosure, an electronic apparatus is provided. The apparatus includes a camera, a storage, and a processor configured to store an image photographed by the camera and metadata of the image in the storage, wherein the processor is further configured to identify whether first information related to the image is obtainable, based on the first information not being obtainable, generate metadata related to the first information based on second information, and store the generated metadata as metadata of the image.

Additional aspects will be set forth in part in the description which follows and, in part, will be apparent from the description, or may be learned by practice of the presented embodiments.

The second information may include at least one other image photographed by the camera, wherein the processor is further configured to obtain the metadata related to the first information from metadata of the at least one other image, and generate the metadata related to the first information based on the obtained metadata.

The first information may include information related to a shooting location of the image, wherein the processor is further configured to, based on the metadata of the image, identify a shooting time of the image, and based on the identified shooting time being between respective shooting times of first and second images of which shooting locations match each other, among the at least one other image, generate the metadata related to the first information based on respective shooting locations of the first and second images.

The second information may include at least one of connection information between the electronic apparatus and an access point (AP) and payment information at a store received from an external server.

The first information may include information related to a shooting location of the image, wherein the processor is further configured to retrieve at least one of a location of the AP and a location of the store, and generate the metadata related to the first information based on the retrieved at least one location.

The metadata may include at least one of a shooting location, a shooting time of the image, and recognition data for a photographed object.

The processor may be further configured to, based on the metadata of the image, identify a shooting time of the image, retrieve second information obtained within a first threshold time based on the shooting time of the image, and based on the metadata related to the first information not being obtained from the retrieved second information, perform additional search for second information obtained within a second threshold time exceeding the first threshold time.

The first threshold time and the second threshold time may be different from each other based on a type of the second information.

In accordance with another aspect of the disclosure, an electronic apparatus is provided. The apparatus includes a display, an input unit, a storage, and a processor configured to display an interactive interface through the display, based on a query for retrieving an image being received through the input unit, identify a first image including metadata which satisfies search criteria in the query from a plurality of images stored in the storage, identify a second image photographed within a predetermined time based on a time when the first image is photographed, or a second image photographed within a predetermined distance based on a location where the first image is photographed among images without metadata related to the search criteria, and control the display to display a search result including the identified first and second images.

The processor may be further configured to store the metadata which satisfies the search criteria as metadata of the identified second image.

The processor may be further configured to classify the identified first and second images into a plurality of categories based on metadata of the identified first and second images, and control the display to display a query message for selecting the plurality of classified categories.

In accordance with another aspect of the disclosure, a method is provided. The method includes controlling an electronic apparatus, the method including storing an image photographed by a camera and metadata of the image, identifying whether first information related to the image is obtainable, based on the first information not being obtainable, generating metadata related to the first information based on second information, and storing the generated metadata as metadata of the image additionally.

The second information may include at least one other image photographed by the camera, wherein the generating of the metadata includes obtaining the metadata related to the first information from metadata of the at least one other image, and based on the obtained metadata, generating the metadata related to the first information.

The first information may include information related to a shooting location of the image, wherein the generating of the metadata includes based on the metadata of the image, identifying a shooting time of the image, and based on the identified shooting time being between respective shooting times of first and second images of which shooting locations match each other, among the at least one other image, generating the metadata related to the first information based on respective shooting locations of the first and second images.

The second information may include at least one of connection information between the electronic apparatus and an access point (AP) and payment information at a store received from an external server.

The first information may include information related to a shooting location of the image, wherein the generating of the metadata includes retrieving at least one of a location of the AP and a location of the store, and generating the metadata related to the first information based on the retrieved at least one location.

The metadata may include at least one of a shooting location, a shooting time of the image, and recognition data for a photographed object.

The generating of the metadata may include, based on the metadata of the image, identifying a shooting time of the image, retrieving second information obtained within a first threshold time based on the shooting time of the image, and based on the metadata related to the first information not being obtained from the retrieved second information, performing additional search for second information obtained within a second threshold time exceeding the first threshold time.

In accordance with another aspect of the disclosure, a method is provided. The method includes controlling an electronic apparatus, the method including displaying an interactive interface, receiving a query for retrieving an image, identifying a first image including metadata which satisfies search criteria in the query from a plurality of pre-stored images, identifying a second image photographed within a predetermined time based on a time when the first image is photographed, or a second image photographed within a predetermined distance based on a location where the first image is photographed, among images without metadata related to the search criteria, and displaying a search result including the identified first and second images.

The method may further include storing the metadata which satisfies the search criteria as metadata of the identified second image.

The method may further include classifying the identifies first and second images into a plurality of categories based on metadata of the identified first and second images, and displaying a query message for selecting the plurality of classifies categories.

According to the above-described various embodiments, a user can retrieve a desired image quickly and conveniently, and be provided with accurate search results according to the user's search intention.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
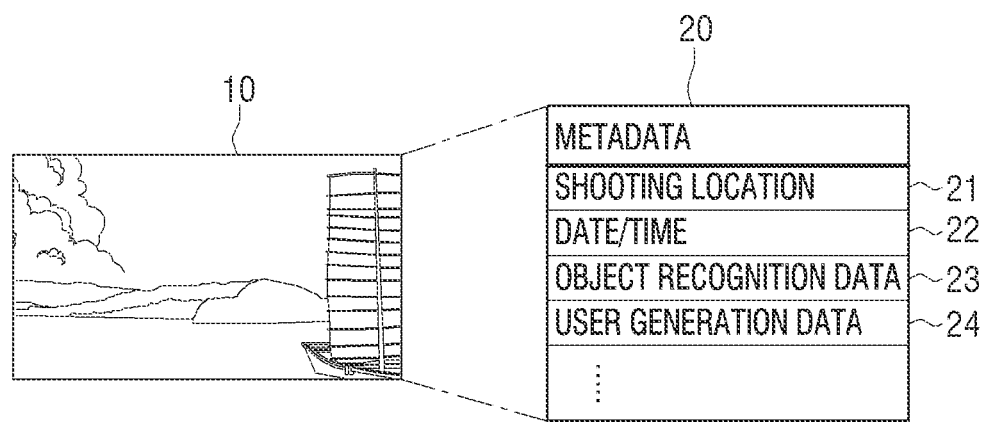
FIGS. 1A and 1B are views illustrating an issue generated by a conventional image retrieving method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the disclosure. In the following description, the configuration which is publicly known but irrelevant to the gist of the disclosure could be omitted.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the disclosure will be described in detail with reference to the accompanying drawings so that those skilled in the art can easily carry out the disclosure. However, the disclosure may be embodied in many different forms and is not limited to the embodiments described herein. In order to clearly illustrate the disclosure in the drawings, some of the elements that are not essential to the complete understanding of the disclosure are omitted for sharpness, and like reference numerals refer to like elements throughout the specification.

Hereinafter, the disclosure will be described in greater detail with reference to drawings attached herein.

Figure 1B:
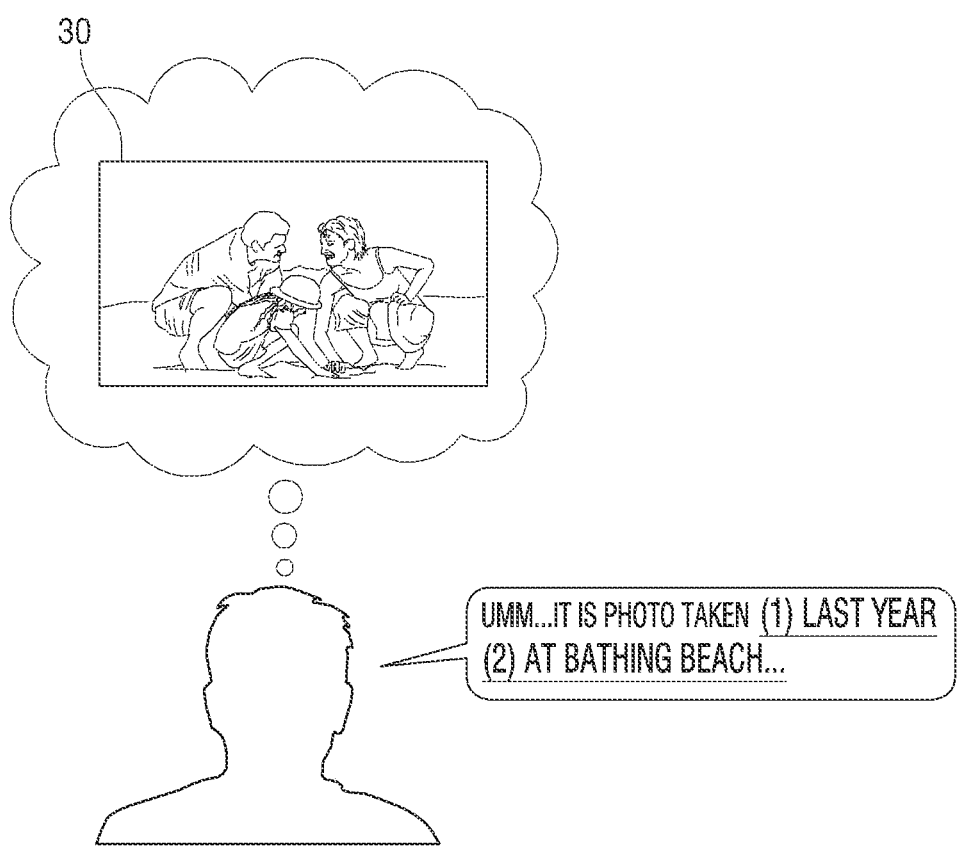

FIGS. 1A and 1B are views illustrating an issue generated by a conventional image retrieving method according to an embodiment of the disclosure.

Referring to FIGS. 1A and 1B, an image photographed by a camera (a photo, a video, etc.) may store photographing-related information in a metadata format. For example, the photographed image may store specific additional information such as a camera maker, a camera model, a shoot date time, an image size, an exposure time (a shutter speed), a shoot program, a lens focal length, an aperture opening value (F-Number), etc. in a metadata format. Such metadata format is, and may be embodied as an EXchangable image file (EXIF) format used in a digital camera.

Examples of metadata may further include a shooting location of an image, recognition data for an object in the image, and user generation data.

The shooting location of the image may be received from a location detection sensor such as global positioning system (GPS) through satellite, or a place identified by recognizing an object in the image. The recognition data for the object in the image may refer to data in which various objects such as a person, an animal, a building, etc. are recognized.

For example, when a contact application includes information that matches 'cheolsu' with the face image of 'cheolsu', and the cheolsu's face is recognized from the photographed image, recognition data of cheolsu may be stored as metadata of the photographed image. In addition, user generation data in which the user directly matches 'cheolsu' with the face image of 'cheolsu' in the photographed image may be stored as the metadata of the photographed image. The user generation data may be data manually created by the user, and may include text, etc. created by the user to describe the photographed image.

Referring to FIG. 1A, if an image is photographed by an electronic apparatus including a digital camera (e.g., a portable camera, a smartphone, a PDA, a tablet PC, a note book, etc.), a shooting location 21, a shooting date/time 22, object recognition data 23, user generation data 24, etc. may be stored as metadata 20 of a photographed image 10.

By using metadata stored together with the photographed image, a user may retrieve the image. For example, when the user inputs information on an image (a shooting, a shooting location, etc.) to be retrieved into a search interface provided by an electronic apparatus as a search keyword, the electronic apparatus may analyze the metadata in the pre-stored image, and provide an image having the metadata matched with the search keyword as a search result.

For example, when the user inputs a command "please find a photo with cheolsu last summer" into an interactive search interface provided by an electronic apparatus, an image having a shooting date and object recognition data matched with keywords such as "last summer" and "cheolsu" as metadata may be displayed as a research result. In this case, a period for summer may be set in advance. For example, if it is set that June to August belongs to summer, an image which was photographed between June and August, and includes recognition data for the face of cheolsu may be selected.

Meanwhile, specific metadata may be missing from metadata that is automatically stored in the photographed image, or erroneous metadata may be included in the photographed image. For example, such cases are considered, where an image is photographed in a state in which a location detection sensor of an electronic apparatus is not operated (e.g., an off state), or an image is photographed in a state in which the location detection sensor is operated (e.g., an on state), but location information is not properly received from satellite. When the location detection sensor is not operated, metadata for the location where the image is photographed may not be stored. In addition, since the location detection sensor such as the GPS traces the location based on outdoor position, when an image is photographed at a place where it is difficult to communicate with satellite, such as inside the building, between tall buildings, etc., erroneous location information may be stored as metadata in the photographed image. In this case, a method for retrieving an image by using the automatically stored metadata has a limit in obtaining an accurate search result.

In a more specific example, referring to FIG. 1B, when searching for a specific photo taken at the beach last year, the user may input a question including a clue related to an image to be retrieved such as "please find a photo taken at the beach last year" through a search interface provided by a search application executed by an electronic apparatus. In this case, an image may be retrieved based on two clues specifying time and location such as "last year" and "beach", but as a search result, an image including both metadata satisfying time information "last year", and metadata satisfying location information "beach" may be provided.

However, as shown in an image 30 of FIG. 1B, when recognition data for an object related to the beach, or metadata related to a shooting location, which is the beach, is not included in the image 30, the image 30 may be omitted from the search result. Examples of the objects related to the beach may include various objects such as sea, white sand, shells, starfish, palm trees, etc. In addition, metadata of the shooting location which can be specified as the beach may include location data detected by the GPS sensor such as latitudes and longitudes corresponding to Maldives beach, Copacabana beach, Boracay beach, etc. Matching information between a generic name (or a place name) indicating a specific place and location data may be stored in an electronic apparatus or received from an external server.

Referring to FIG. 1B, although the image 30 includes the metadata related to the shooting date/time, metadata used for identifying the shooting location as 'beach', for example, location data detected by the GPS sensor, or object recognition data for identifying the shooting location as 'beach' may not be included. Therefore, the image 30 may be excluded from the search result.

Accordingly, the user may find it difficult to search for the image 30.

Therefore, the disclosure may provide a method for accurately proving an image desired by a user, even when specific metadata is missing from the photographed image.

<Automatic Tagging Method of Metadata Based on Context>

Figure 2:
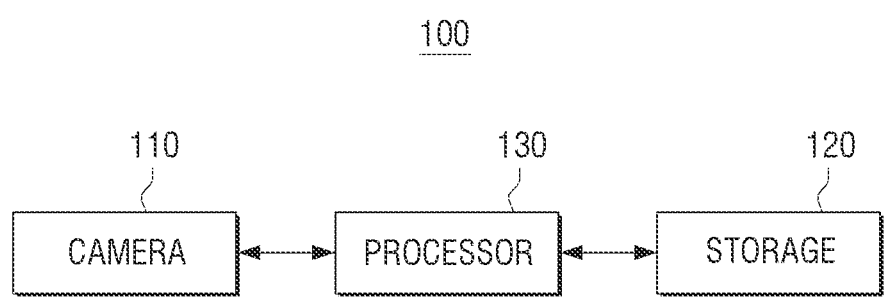
FIG. 2 is a schematic block diagram illustrating configuration of an electronic apparatus according to an embodiment of the disclosure.

FIG. 2 is a schematic block diagram illustrating configuration of an electronic apparatus according to an embodiment of the disclosure.

Referring to FIG. 2, an electronic apparatus 100 may be embodied as various electronic apparatuses such as PDA, PMP, smart phone, tablet PC, personal computer, notebook computer, wearable digital electronic device, etc.

The electronic apparatus 100 may include a camera 110, a storage 120, and a processor 130.

The camera 110 may photograph an image. Specifically, the camera 110 may convert an image of an object into an electrical signal, and then convert the electrical signal into a digital signal to store the digital signal in the storage 120.

The storage 120 may be configured to store the photographed image. The storage 120 may be embodied as various storage media including a hard disk drive (HDD), a solid state drive (SSD), a DRAM memory, an SRAM memory, a FRAM memory, or a flash memory.

The processor 130 may be configured to control the overall operation of the electronic apparatus 100. To be specific, the processor 130 may store the image photographed by the camera 110, and metadata of the image in the storage 120. The metadata may be tagged to the image.

The processor 130 may identify whether first information related to an image is obtainable, when if not, generate metadata related to the first information based on second information, and store the generated metadata as metadata of the image.

The first information may be information related to metadata which is not included in the image.

The second information may refer to context at a time when an image is photographed, and may include at least one other image photographed by the camera 110, information on the operation executed by the electronic apparatus 100, information stored in the electronic apparatus 100, etc. such as connection information between the electronic apparatus 100 and an access point (AP), payment information at a store, which is received from an external server, etc.

According to an embodiment, as described above, when metadata related to the shooting date time is included in the photographed image (hereinafter, referred to as a first image), but metadata related to the shooting location is not included in the photographed image, the processor 130, based on the metadata of the first image, may identify the shooting time of the first image, and based on the shooting location of at least one other image (hereafter, a second image) photographed within a predetermined period of time based on the identified shooting time, generate metadata related to the shooting location of the first image.

The processor 130 may identify at least one second image photographed within a predetermined period of time before and after a time when the first image is photographed, and store metadata related to the shooting location in the identified second image in the photographed first image.

For example, when the first image was photographed at 3:00 pm on Aug. 10, 2017, and the second image photographed within 30 minutes based on 3:00 pm on Aug. 10, 2017, i.e. between 2:30 pm and 3:30 pm, is an image photographed near the Paris Eiffel Tower, it may be likely that the first image is also photographed near the Paris Eiffel Tower (at least not far from the Paris Eiffel Tower).

The processor 130 may obtain metadata related to the shooting location of the second image (near the Paris Eiffel Tower), and store the obtained metadata as metadata of the first image. If there are a plurality of other images photographed from 2:30 pm to 3:30 pm, the shooting location of one of the plurality of other images may be stored as the metadata related to the shooting location of the first image. In this case, it is desirable that the shooting location of another image photographed at a point of time closest to a point of time when the first image is photographed is stored as the metadata related to the shooting location of the first image.

Particularly, when the shooting time of the first image is between the shooting times of the second and third images, in which the shooting locations of the second and third images are matched with each other, the processor 130 may generate metadata related to the shooting location of the first image based on respective shooting locations of the second and third images.

For example, if the second and third images photographed at 2:50 PM and 3:05 PM, respectively, include metadata associated with the same shooting location (near the Eiffel Tower), it can be strongly identified that the first image was photographed at 3:00 PM near the Eiffel Tower as well. Such embodiment will be described in detail with reference to FIGS. 3 and 4 below.

When it is identified that metadata related to the shooting location is not included in the photographed image, the processor 130 may identify the location of the electronic apparatus 100 at a time when the image is photographed by using AP information connected to the electronic apparatus 100, and store the identified location as metadata related to the shooting location of the photographed image. Various types of wireless communication signals using such as 3G, LTE, Wibro, Wi-Fi, etc. may be provided to the electronic apparatus 100 through an AP mounted at each region so that the electronic apparatus 100 may access a wireless network. The processor 130 may explore the location of AC based on the record of the AP connected to the electronic apparatus 100 at the time when the image is photographed, and store the explored location of the AP as the metadata related to the shooting location of the photographed image.

In addition, immediately after photographing an image, within a predetermined time, the processor 130 may identify whether metadata related to the shooting location is included in the image, and when it is identified that the metadata related to the shooting location is not included, the processor 130 may store the location of the AP, which is at a high level of signal intensity, among collected information of neighboring APs, as the metadata related to the shooting location of the photographed image.

The Wi-Fi based location tracking technology for identifying the current location based on the AP nearest to the location to be identified such as the Cell-ID is a well-known technique in the art. Therefore, the detailed description of a method for identifying the location of the electronic apparatus 100 by using the AP near the electronic apparatus 100 will be omitted.

The processor 130 may identify the location of the electronic apparatus 100 at a time when an image is photographed by using payment information at a store within a predetermined time based on the time when the image is photographed, and store the identified location as metadata related to the shooting location of the photographed image.

For example, when the user photographs an image and after 10 minutes, makes payment at the store by using a credit card, the processor 130 may explore or identify the store location by using information on the store, which is included in payment-related information received from a credit card company, and identifies the explored or identified location of the store as the location of the electronic apparatus 100 at the time when the image is photographed. The processor 130 may store the identified location of the electronic apparatus 100 as metadata related to the shooting location of the photographed image.

The processor 130, based on metadata of the image, may identify the shooting time of the image, based on the identified shooting time of the image, retrieve information obtained within a first threshold time, and when failing to obtain metadata which is not tagged to the image based on the retrieved information, additionally retrieve information obtained within a second threshold time exceeding the first threshold time. For example, if there is no information obtained within 30 minutes based on 2:00 on Nov. 13, 2014 when the image was photographed, information obtained within one hour may be additionally retrieved.

The first and second threshold times may vary depending on the type of information obtained for generating metadata which cannot be obtained from the photographed image. For example, for the connection information of the AP, the user may likely to stay long in the region, so that the first and second threshold times may be set to 10 minutes and 20 minutes, respectively. However, for the payment information at the store, the user may likely to be soon out of the region, the first and second threshold times may be set to 5 minutes and 10 minutes, respectively.

Further, as described above, the technical idea of the disclosure can be extended not only when it is identified that there is metadata related to information which is not obtainable with respect to the photographed image, but also when erroneous metadata is included in the image.

For example, when the first to third image are consecutively photographed at an interval of 10 minutes, metadata related to the shooting locations of the first and third images may indicate a specific region of Jeju Island, and metadata related to the shooting location of the second image may indicate a specific region of Busan. In this case, it can be identified that the metadata related to the shooting location of the second image is not correct. The processor 130 may replace the metadata related to the shooting location of the second image with the metadata related to the shooting locations of the first and third images.

According to another example, based on location information received from the GPS, metadata related to the shooting location of the photographed image may be stored as a location corresponding to 'my home'. When payment information at a store 10 km away from my home is received from an external server 3 minutes after the shooting time of the photographed image, it is identified that the metadata related to the photographed image is not correct. The processor 130 may replace the stored metadata related to the shooting location of the image as metadata generated based on the location of the store where payment is made.

Figure 3:
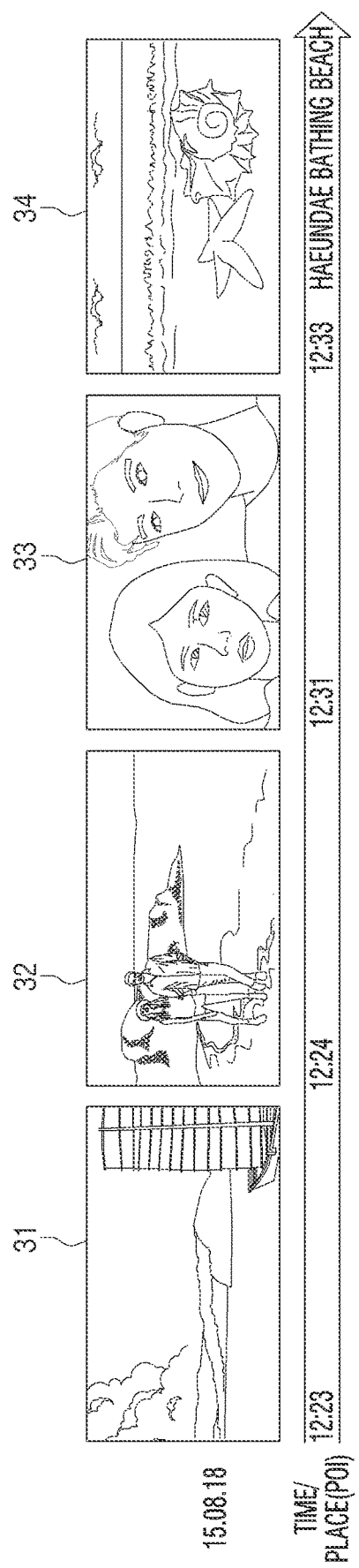
FIG. 3 is a schematic view to explain a metadata storage method according to an embodiment of the disclosure.

FIG. 3 is a schematic view to explain a metadata storage method according to an embodiment of the disclosure.

The storage 120 of the electronic apparatus 100 may store the first to fourth images 31 to 34 consecutively photographed, and each of the images 31 to 34 may include metadata related to the shooting time. The processor 130 may analyze each of the images 31 to 34, and store the analyzed data as metadata related to each of the images 31 to 34. The metadata stored in association with each of the images 31 to 34 may include recognition data for an object in the image, and data for the shooting location identified from the recognition data.

For example, referring to FIG. 3, the first image 31, the second image 32, and the fourth image 34 may include objects such as seashell, starfish, sea, ship, seagull, etc. that allows to identify that the shooting location is bathing beach, and the processor 130 may identify the shooting locations of the images 31, 32, and 34 as the bathing beach. The processor 130 may generate the "bathing beach" as metadata related to the shooting locations of the images 31, 32, and 34, and store the generated metadata as the metadata of each of the images 31, 32 and 34.

Accordingly, when a user searches for a photo taken at the bathing beach in the electronic apparatus 100 and inputs a keyword such as "bathing beach", or "sea" or "beach" related to the "bathing beach", the images 31, 32 and 34 including metadata indicating that the shooting location is the "bathing beach" may be retrieved. The keyword related to the bathing beach such as "sea" or "beach" may be matched with the "bathing beach", and stored in the storage 120, or stored as metadata related to the images 31, 32 and 34.

However, although a third image 33 in FIG. 3 is photographed at the bathing beach in the same manner as other images 31, 32, and 34, an object that allows to identify the shooting location as sea may not be included. Therefore, although the processor 130 analyzes the third image 33, metadata indicating that the shooting location of the third image 33 is the bathing beach may not be generated.

In this case, the electronic apparatus 100 according to an embodiment of the disclosure may identify the shooting location of the third image 33 based on metadata of shooting locations of the second image 32 photographed immediately before (12:24 PM) the shooting time of the third image 33 (12:31 PM), and the fourth image 34 photographed immediately after (12:33 PM) the shooting time of the third image. The second image 32 and the fourth image 34 will be referred to as neighboring photographed images for convenience of explanation.

The processor 130 may extract metadata related to the shooting locations of neighboring photographed images 32 and 34, and when it is identified that the neighboring photographing images 32 and 34 are both photographed at the bathing beach, the shooting location of the third image 33 may be the bathing beach. Accordingly, the processor 130 may tag the bathing beach as the metadata related to the shooting location of the third image 33.

Accordingly, without the object to identify that the shooting location of the third image 33 is the bating beach, the user may be provided with the third image 33 as an image search result matched with the keyword "bathing beach".

Figure 4:
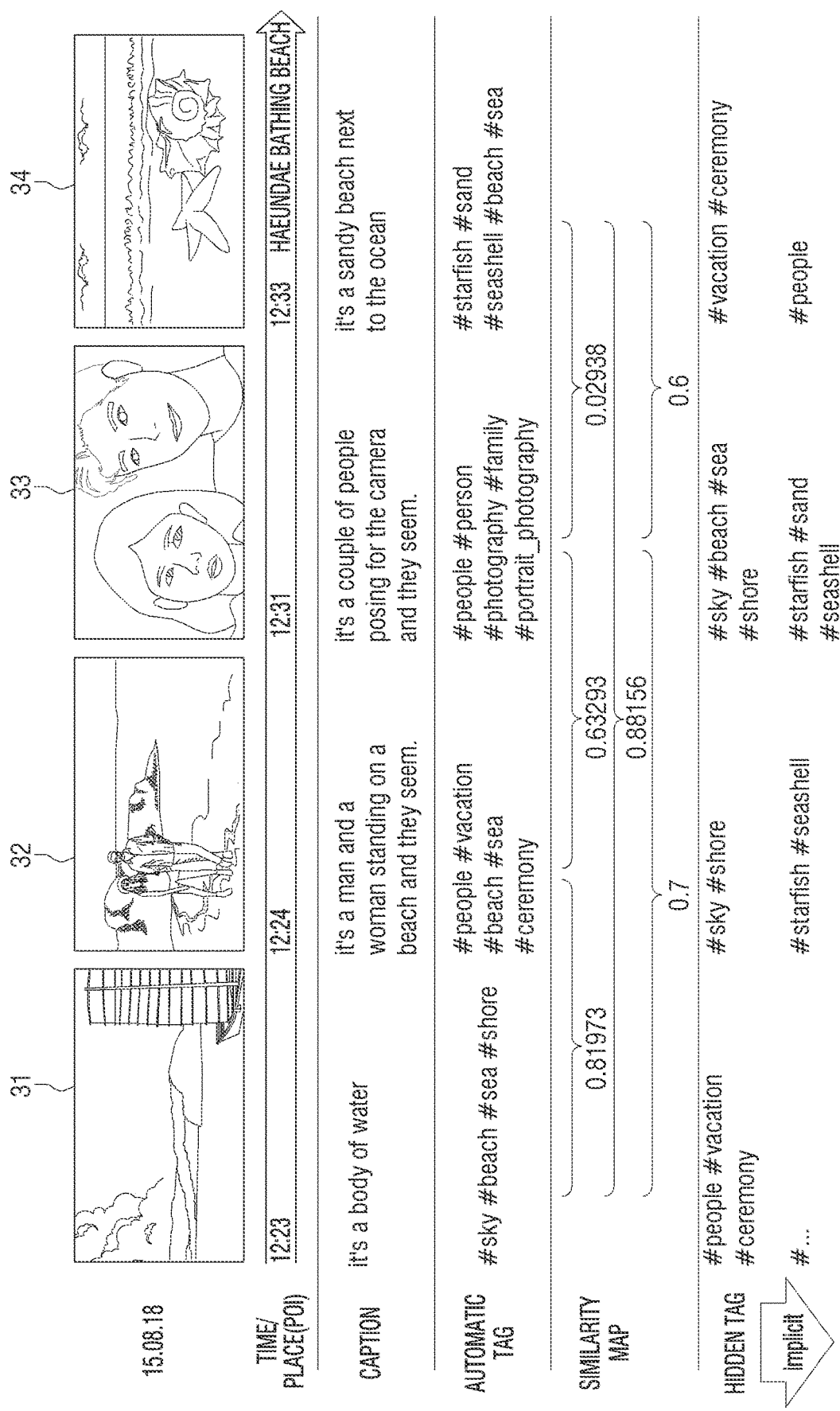
FIG. 4 is a detailed view to explain a metadata storage method according to an embodiment of the disclosure.

FIG. 4 is a detailed view to explain a metadata storage method according to an embodiment of the disclosure.

Recently, a service for automatically generating and providing caption describing a photo entered into a computer has been introduced. As an example, neural image caption (NIC) system of Google automatically generates and provides text caption describing what the image is based on machine learning.

The electronic apparatus 100 may receive caption describing each of the first to fourth images 31 to 34 from an external server that provides an automatic caption generation service, or support an auto caption generation service by itself to generate caption. In the description of FIG. 4, metadata will be referred to as tags for ease of explanation.

Referring to FIG. 4, according to the automatic caption generation service, Captions such as "it's a body of water" for the first image 31, "it's a man and a woman standing on a beach and they seem" for the second image 32, "it's a couple of people posing for the camera and they seem" for the third image 33, and "it's a sandy beach next to the ocean" for the fourth image 34 may be generated.

The processor 130 may generate a tag for each image by using the generated caption. For example, for the first image 31, keywords associated with "body of water", such as "sky", "beach", "sea" and "shore" may be generated as tags. Similarly, for the second image 32, keywords "people", "vacation", "beach", "sea", "ceremony", etc. associated with "man", "woman", "standing", "beach", etc. may be generated as tags. For the third image 33, keywords "people", "person", "photography", "family", "portrait photography", etc. associated with "couple", "people", "posing for the camera", etc. may be generated as tags. For the fourth image 34, keywords "starfish", "sand", "seashell", "beach", "sea", etc. associated with "sandy beach", "ocean", etc. may be generated as tags.

The processor 130 may use tags generated in association with the first to fourth images 31 to 34, and calculate similarity between the first to fourth images 31 to 34. The similarity may refer to not only the similarity between images, but the similarity between contexts at a time when each image is photographed. For example, although the photographed objects are different, if the different objects are photographed at the same place, the degree of similarity may be calculated to be higher than the case where the different objects are photographed at different places.

The processor 130 may control images of which similarity is equal to or greater than a predetermined threshold value, which are photographed within a predetermined period of time, to share tags according to the calculated similarity.

For example, if a predetermined threshold value is equal to or greater than 0.5, the first image 31 and the second image 32 may be consecutively photographed at a time interval of 1 minute, and similarity between tags automatically generated by caption may be equal to or greater than 0.5, the first and second images 31 and 32 may share the generated tags each other. Tags such as "people", "vacation" and "ceremony" of the second image 32 may be stored in a hidden tag format in the first image 31. Conversely, tags such as "sky" and "shore" of the first image 31 may be stored in a hidden tag format in the second image 32.

The processor 130 may calculate the degree of similarity between the first to fourth images 31 to 34 by using respective tags of the first to fourth images 31 to 34. The degree of similarity between the first to fourth images 31 to 34 may be calculated based on the similarity map between the tags automatically generated for each of the images 31 to 34.

Accordingly, the similarity between the first image 31 and the second image 32 may be calculated as 0.81973, the similarity between the second image 32 and the third image 33 may be calculated as 0.63293, and the similarity between the third image 33 and the fourth image 34 may be calculated as 0.02938. Since the first image 31, the second image 32, and the fourth image 34 include a common tag such as "sea", "beach", etc., the similarity may be relatively high. However, since the third image 33 and the fourth image 34 do not include a common tag, the degree of similarity may be relatively low.

However, since the third image 33 is an image photographed at the bathing beach, similarity between the third image 33 and the images 31, 32 and 34 may be significant. Therefore, a method for determining similarity by using only the tag automatically generated through caption may have a limit.

The processor 130 may modify the similarity based on a tag for the shooting time of each of the images 31 to 34. To be specific, the third image 33 and the fourth image 34 may be photographed within a predetermined period time (e.g., 30 minutes) at a time interval of 2 minutes. Accordingly, the processor 130 may identify that the third image 33 is photographed at the same location as the fourth image 34, which is the bathing beach. The predetermined time may be various, for example, within 10 minutes, or 20 minutes.

Referring to FIG. 4, based on the tag for the shooting time, the similarity between the third image 33 and the fourth image 34 may be modified from 0.02938 to 0.6.

Accordingly, "people", "vacation" and "ceremony" of the second image 32 may be stored as hidden tags in the first image 31. The second image 32 may store "sky" and "shore"

of the first image 31, and "starfish" and "seashell" of the fourth image 34 as hidden tags. The third image 33 may store "sky", "beach", "sea" and "shore" of the first image 31, and the fourth image 34 may store "starfish", "sand", and "seashell" as hidden tags. The fourth image 34 may store "vacation" and "ceremony" of the second image 32, and "people" of the third image 33 as hidden tags.

Hereinafter, a method for performing image search by using additionally stored metadata will be described in detail.

<Image Search Method Based on Metadata>

Figure 5:
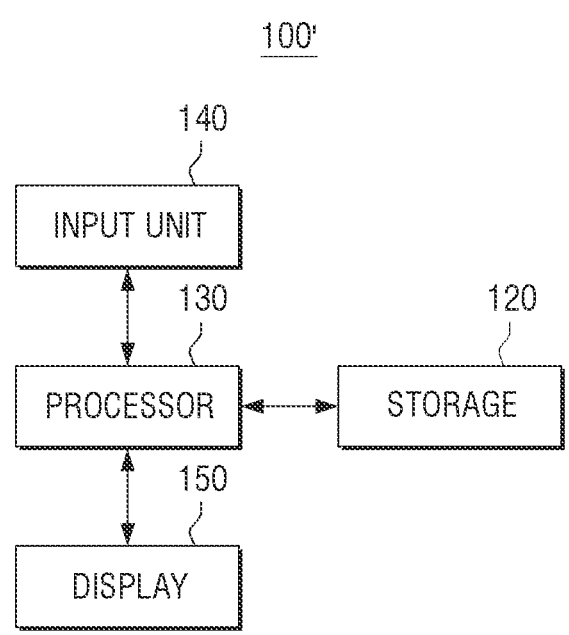
FIG. 5 is a schematic block diagram illustrating configuration of an electronic apparatus according to another embodiment of the disclosure.

FIG. 5 is a schematic block diagram illustrating configuration of an electronic apparatus according to another embodiment of the disclosure.

Referring to FIG. 5, an electronic apparatus 100' according to another embodiment of the disclosure may further include an input unit 140 and a display 150. According to an embodiment, a camera 110 may not be necessarily included in the electronic apparatus 100'.

The input unit 140 may be configured to detect user interaction for controlling the overall operation of the electronic apparatus 100' and receive a user command The input unit 140 may be embodied with a touch panel as well as physical buttons.

The display 150 may be configured to provide a screen displaying information. In particular, the display 150 may display various information under the control of the input unit 140. The display 150 may be implemented as with liquid crystal display panel (LCD), organic light emitting diodes (OLED), transparent display, or flexible display, but is not limited thereto. In addition, a driving circuit, a backlight unit, and the like that can be implemented in the form of a-si TFT, low temperature poly silicon (LTPS) TFT, organic TFT (OTFT), etc. may be included in the display 150.

The display 150 may be embodied with a touch display. Since the touch display receives a user input through a finger or a touch pen, the input unit 140 may be needed. To be specific, the touch display may consist of a display panel (not shown) for performing a display function on output information output from the electronic apparatus 100' and an input sensing panel (not shown) for performing various input functions by a user.

The display panel may be embodied with Liquid LCD or OLED, and structurally integrated with an input detection panel. The display panel may display various operation states of the electronic apparatus 100', menu states, application execution states, services, etc.

The input sensing panel may detect various inputs such as a single input or a multi-touch input, a drag input, a writing input, a drawing input, etc. of a user using a finger, an electronic pen, etc. The input sensing panel may be embodied with a single panel capable of both finger input sensing and pen input sensing, or embodied with two panels such as a touch panel capable of finger input sensing and a pen recognition panel capable of pen input sensing.

The processor 130 may display an interactive interface through the display 150, and receive a query for retrieving an image from a user through the input unit 140.

The processor 130 may execute an application installed in the electronic apparatus 100' and control the display 150 to display an interactive search interface provided by an application. The application may be an application for retrieving a content such as an image, etc. and may provide an interactive search interface for a back-and-forth dialogue.

Figure 6:
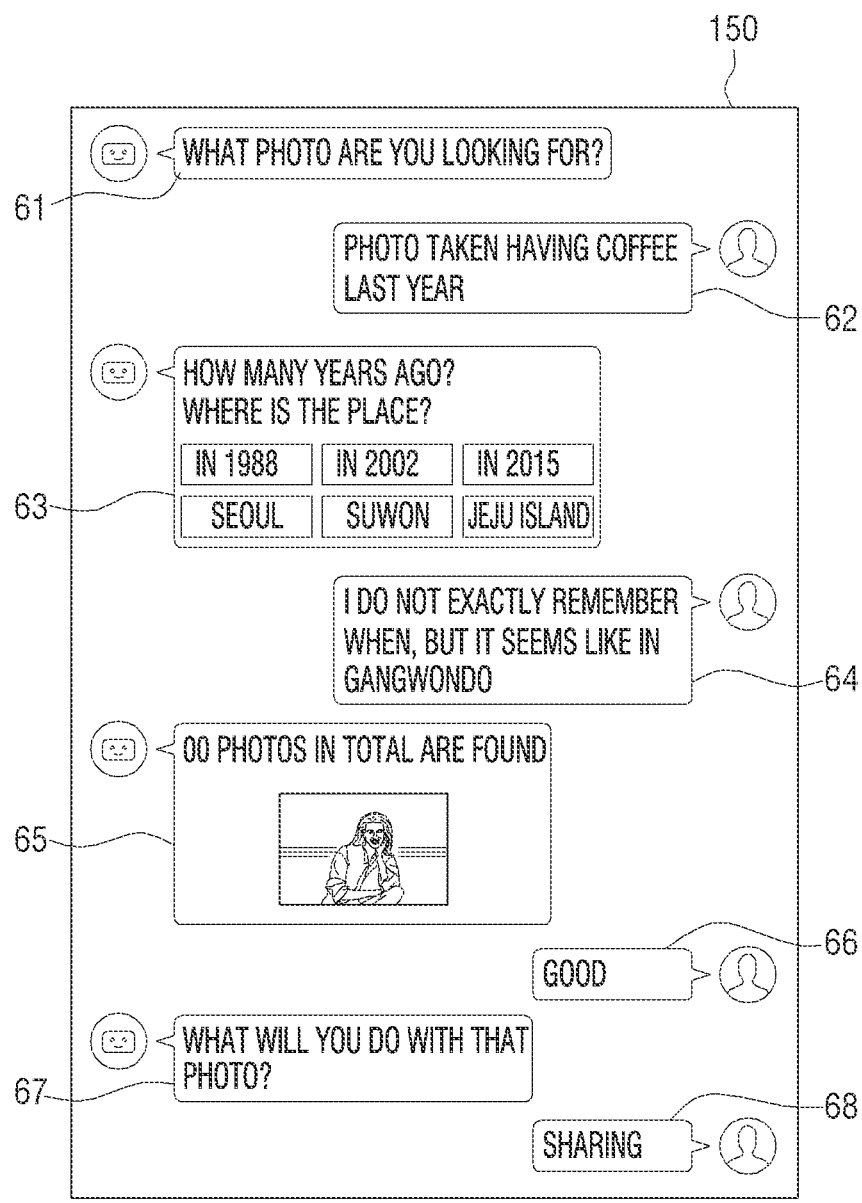
FIGS. 6, 7, and 8 are views illustrating a search interface screen according to various embodiments of the disclosure.

FIG. 6 is a view illustrating a search interface screen according to various embodiments of the disclosure.

Referring to FIG. 6, when an application is executed, the processor 130 may guide a user to input a search word by displaying a query 61 such as "which photo are you looking for" in a text box format. The user may input a query for retrieving an image such as "having coffee last summer" 62 to an input window displayed on a screen. The search criteria in the input query may be "summer", "coffee", etc. The processor 130 may display the input query on the interactive interface, identify an image with metadata satisfying the search criteria such as "summer", "coffee", etc. from a plurality of images stored in the storage 120, and provide the image as a search result.

The processor 130 may provide the image with the metadata satisfying the search criteria as a first search result. For example, the processor 130 may analyze metadata of the images stored in the storage 120, and display an image photographed between June and August, which belong to summer and is set in advance, and an image with object recognition data 'coffee' as the first search result. The processor 130 may proceed with an additional query 63 before displaying the search result or while displaying part of the search result in order to sort out the search result when the searched image is equal to or greater than a predetermined number.

The processor 130 may classify the images in the first search result into a plurality of categories based on metadata, and control the display 150 to display a query message for selecting the classified category.

For example, the images in the first search result may be classified into sub-categories according to the shooting year and the shooting location. Referring to FIG. 6, the processor 130 may perform the additional query 63 such as "how many years ago, where does it happen", and display a UI that is conveniently designed for the user to easily select the shooting year and the shooting location in a text box.

When the shooting time of the searched image is categorized by the summer of 1988, the summer of 2002, the summer of 2015, etc., a UI indicating the categories of "1988", "2002" and "2015" may be displayed. When the shooting location of the searched image is categorized by "Seoul", "Suwon", "Jeju Island", etc., a UI indicating the categories of "Seoul", "Suwon" and "Jeju Island" may be displayed. However, the UI may display only a predetermined number of top-most images in descending order of the number of retrieved images. When a text box of the additional query 63 is selected, a UI for selecting the shooting time and the shooting location may be expanded, so that a number of options may be provided. The processor 130 may display part of the first research result alongside a UI for indicating a plurality of categories.

Accordingly, when the user memorizes only the shooting time, the user may select a UI of one of "1988", "2002", and "2015", and when the user memorizes only the shooting location, the user may select a UI of one of "Seoul", "Suwon", and "Jeju Island", to thereby narrow the range of the first search result. In other words, the user may select one of the shooting location and the shooting time to search for a desired image, so that the convenience may be enhanced.

The user may narrow the range of the first search result by inputting an additional clue in an interactive format when the shooting location of the image is not displayed as a UI in the additional query 63, or search is performed through voice recognition. Referring to FIG. 6, when the user does not memorize the shooting year exactly, but memorizes the shooting location vaguely, it is possible to input an additional clue 64 such as "I do not exactly remember when, but it seems like in Gangwon-do".

In the first search result, the processor 130 may further select an image having the metadata of the shooting image as "Gangwon-do", and output the selected image as s second search result 65. When the output second search result is smaller than a predetermined number, at least one thumbnail of the retrieved images may be displayed together with a message such as "Total OO photos found". When the user selects the displayed search result 65, the search result 65 may be expanded and a thumbnail of the entire image in the second search result 65 may be displayed. The user may select one of the retrieved images and perform an additional operation using the retrieved images.

When the user is satisfied by the second search result 65 and desires not to perform additional search, the user may input a message 66 for terminating the search such as "good". The processor 130 may display a query message 67 on which additional task to perform on the image provided as the second research result 65.

When the user inputs "sharing" 68 as a response to the query, the processor 130 may display a UI for selecting an image to be shared of the search result 65, and a UI for selecting one to share the selected image. An additional UI for selecting a route for sharing the image selected by the user with the one W may be displayed, and the processor 130 may make it possible to share the selected image with the selected one according to the route selected by the user. For example, the processor 130 may simply transmit the selected image to the selected one, or upload the selected image to the Internet site provided through a social network, so that the user may view the uploaded image with the selected one.

Referring to FIG. 6, sharing is exemplified as an additional task, but examples of the additional task may further include copying, editing, etc. of an image.

The processor 130 may additionally display an image photographed within a predetermined time based on a time when at least one of the images in the second research result 65 is photographed, among images without metadata related to the input search criteria, as a search result.

For example, an image without metadata related to the shooting location, among the images stored in the storage 120, may be an image without metadata related to the input search criteria (Gangwon-do). When the image in the second search result 65 is a first image, the processor 130 may additionally retrieve and display an image photographed within a predetermined time (referred to as a second image) based on a time when at least one of the first images is photographed, from the images without metadata related to the shooting location among the images stored in the storage 120. In other words, it can be strongly identified that the image photographed before or after 10 minutes or 20 minutes based on the time when the first image photographed in Gangwon-do (a second image) is photographed in Gangwon-do. Therefore, the metadata related to the shooting location of the first image may be used.

The user may be provided with a search result with minimized errors of omission of the desired images.

The processor 130 may store the metadata satisfying the search criteria, that is, the place name 'Gangwon-do' or the location data of Gangwon-do as metadata related to the second image, and may control the display 150 to display a search result including the first and second images.

Figure 7:
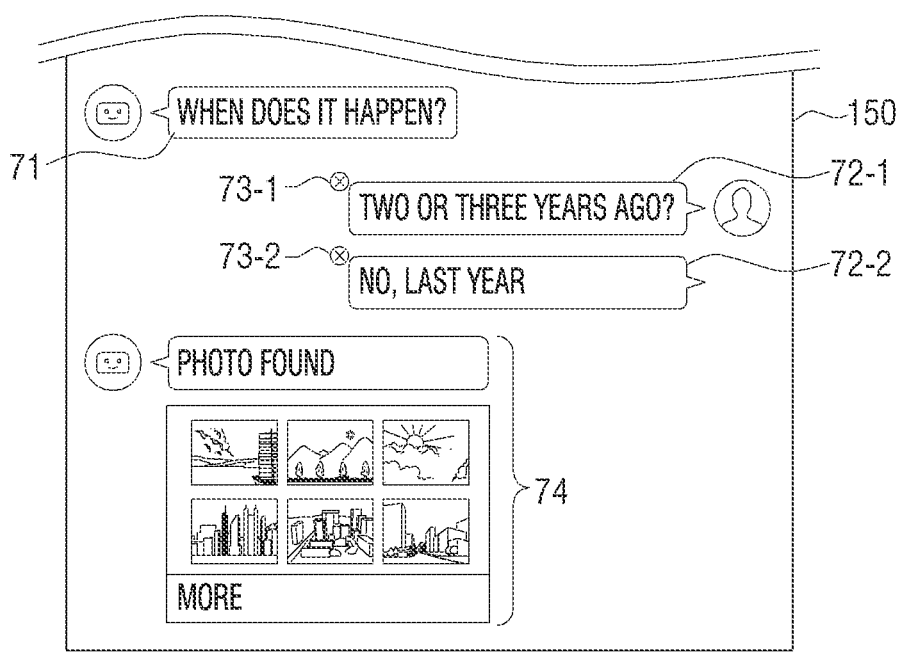
Figure 8:
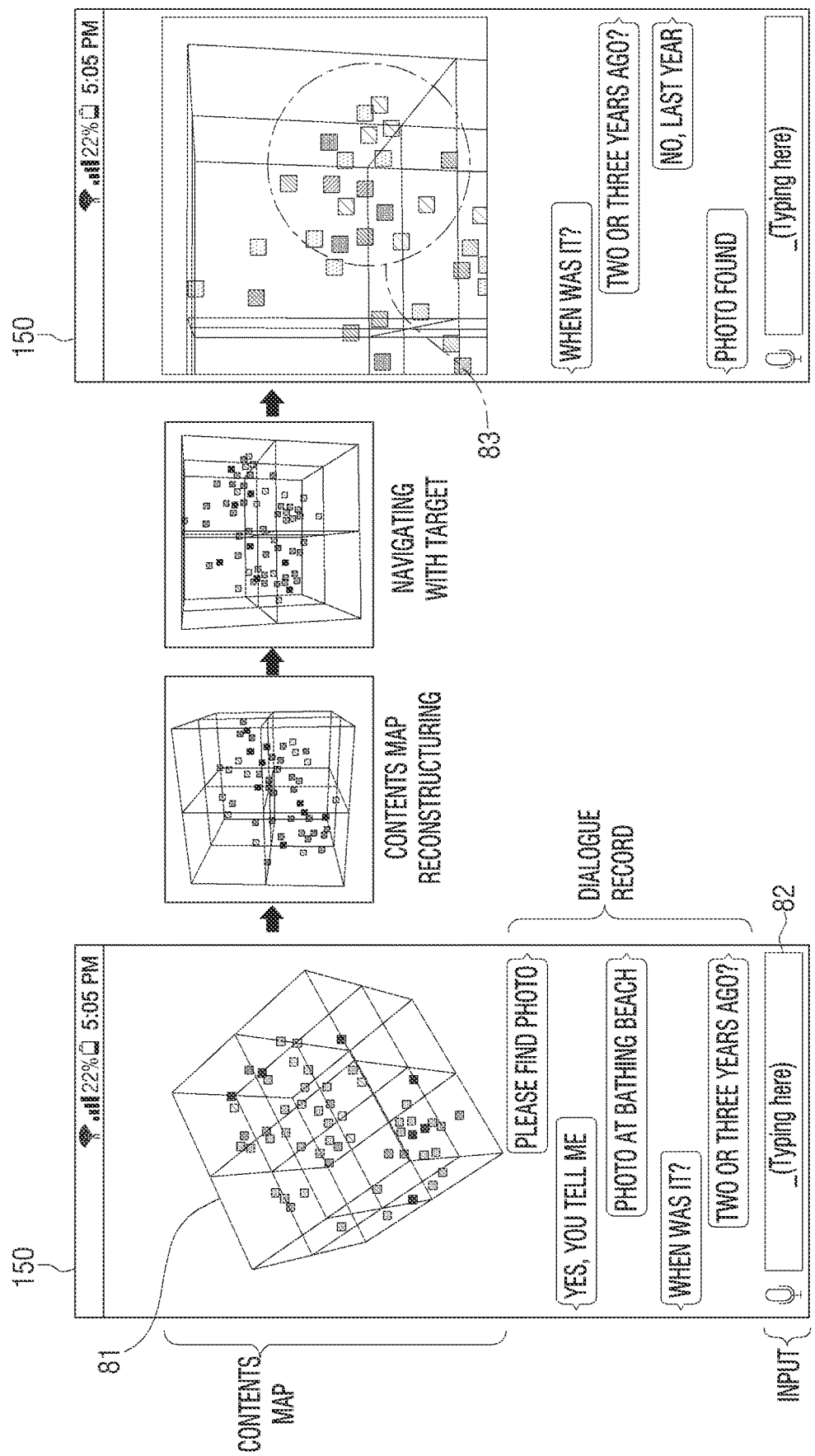

FIGS. 7 and 8 are views illustrating a search interface screen according to various embodiments of the disclosure.

Referring to FIG. 7, the processor 130 may control the display 150 to display a query 71 on a point of time when an image is photographed through an interactive interface, and a user may input a text 72-1 providing a broad clue such as "2~3 years ago? " as a response to the query 71. In this case, the processor 130 may provide an image photographed 2~3 years ago from the current date (date/month/year) as a search result based on metadata related to a point of time when the image stored in the storage 120 is photographed.

When the user wishes to modify the text input for search since the user cannot remember exactly, the user may cancel the image search based on the input text, input a new text within a predetermined time, and request for the image search based on the newly input text. For example, the user may input a text 72-2 including "no" for cancelling the previously input text "2~3 years ago? " which is followed by "last year" that provides a clue for a new shooting time. The processor 130 may ignore the text 72-1 "2~3 years ago" and provide an image photographed last year, among images stored in the storage 120, as a search result.

UIs 73-1 and 73-2 for deleting a text box may be displayed on one side of the text box to which the user inputs the text, and the user may delete the input text by selecting the UIs 73-1 and 73-2 and input new text.

Referring to FIG. 7, the processor 130 may output a search result 74 including thumbnail images of the searched images displayed along with a message such as "photos found".

FIG. 8 is a view illustrating a search interface screen for allowing a user to directly search for an image through a contents map according to another embodiment of the disclosure.

Referring to FIG. 8, a contents map 81 for navigating an image may be displayed on one side of the interactive interface. The contents map 81 has a form in which UIs representing a plurality of images stored in the storage 120 are distributed in a cube. The cube may have a plurality of axes corresponding to respective metadata in the images, and the images may be distributed close to or far from each other according to the similarity of the metadata.

For example, based on an axis corresponding to the shooting time, a UI of a first image photographed in July, 2007 may be closer to a UI of a third image photographed in January, 2008 than a UI of a second image photographed in January, 2003. However, when the first image is photographed in Seoul, the second image is photographed in Gangwon-do, and the third image is photographed in Hukuoka, the UI of the first image may be closer to the UI of the second image than the UI of the third image based on the axis corresponding to the shooting location. The user may rotate the contents map 81 by touching, adjust an angle at which the contents map 81 is displayed, and intuitively identify the correlation between images along respective axes.

When the user inputs search criteria for the shooting time and the shooting location such as "happy at the beach", "two~three years ago", etc. through an input window 82, the processor 130 may reconstruct the contents map 81 to include UIs of images including metadata satisfying the research criteria (UIs of the searched images), and UIs of images similar to the searched images. As described above, the UIs of images similar to the searched images may include UIs of images closely distributed according to the similarity of metadata.

The axis corresponding to the shooting time and the axis corresponding to the shooting location of the contents map 81 to be reconstructed may be scaled down depending on the shooting time and the shooting location of the searched image, respectively.

The processor 130 may navigate the contents map 81 targeting UIs of the searched images according to the search criteria input by the user while reconstructing a contents map. By controlling the angle of the contents map 81 to bring the UIs of the searched images according to the search criteria input by the user to the center of the contents map 81, the UIs of the searched images may be enlarged and displayed. Referring to FIG. 8, the UIs of the searched images may be displayed as thumbnail images 83.

Figure 9:
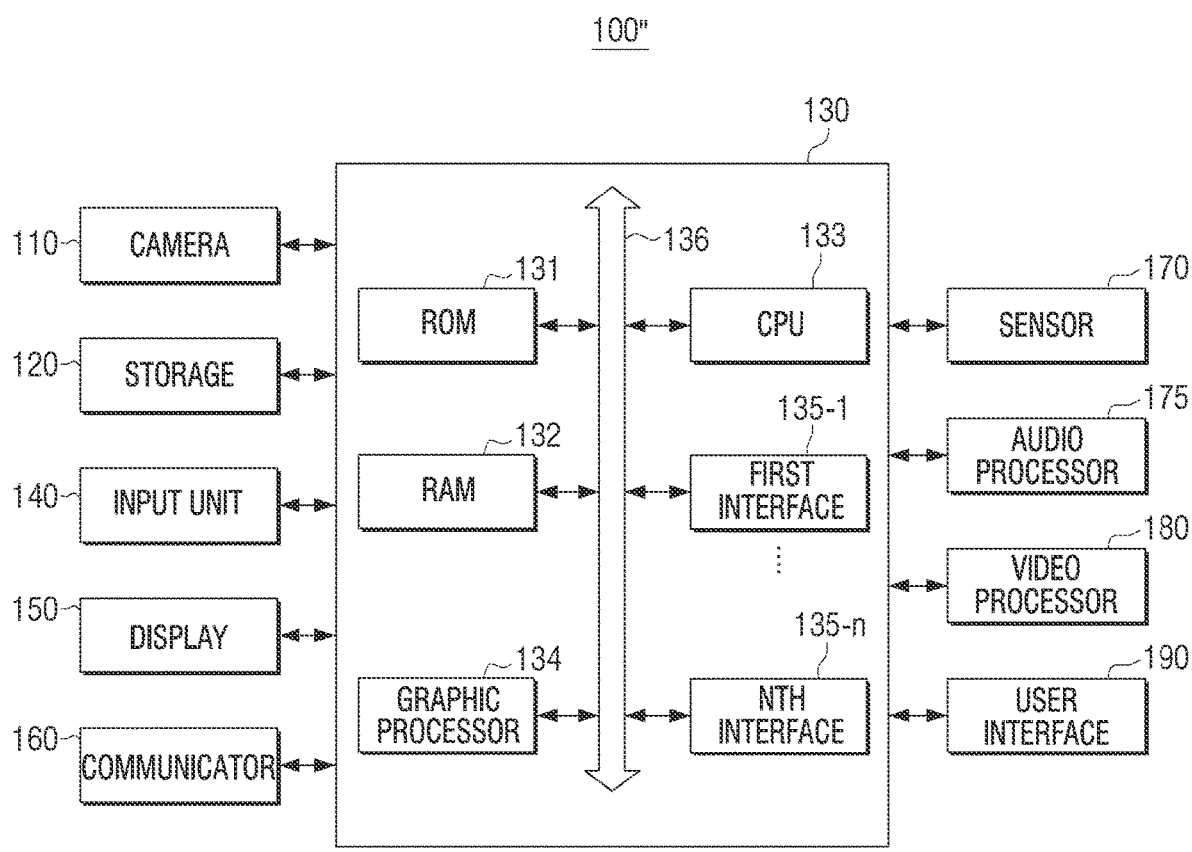
FIG. 9 is a detailed block diagram illustrating configuration of an electronic apparatus according to an embodiment of the disclosure.

FIG. 9 is a detailed block diagram illustrating configuration of an electronic apparatus according to an embodiment of the disclosure.

Referring to FIG. 9, an electronic apparatus 100" according to another embodiment of the disclosure may include a camera 110, a storage 120, a processor 130, an input unit 140, a display 150, a communicator 160, a sensor 170, an audio processor 175, a video processor 180, and a user interface 190. The repeated description of FIG. 2 will be omitted.

The communicator 160 may be configured to perform communication with a server or an external device. The communicator 160 may communicate with the server or the external device through various communication methods using radio frequency (RF) and infrared (IR) such as bluetooth (BT), Wi-Fi, Zigbee, NFC, etc., and may be provided with a communication element including at least one of a ZigBee communication element, a BT communication element, and a Wi-Fi communication element.

The communicator 160 may receive caption describing the photographed image from an external server that provides an automatic caption generation service, or receives wireless communication signals using various communication method such as 3G, LTE, Wibro, Wi-Fi, etc. through the neighboring AP. In addition, the communicator 160 may exchange information with various external devices or servers, such as receiving payment related information from a credit card company.

The sensor 170 may be configured to detect the current geographic location of the user. The sensor 170 may detect the current location of the user having an electronic apparatus 100" by using a GPS signal, and include a GPS module for providing a map information service for neighboring areas based on the detected current location, navigation service, etc.

The audio processor 175 may be configured to perform processing on audio data. However, the audio data may be processed by an audio processing module stored in the storage 120.

The video processor 180 may be configured to perform various image processes such as decoding, scaling, noise filtering, frame rate conversion, resolution conversion, etc. of a content. However, the video processing may be performed by a video processing module stored in the storage 120.

The user interface 190 may include a microphone (not shown) for receiving a user command for voice recognition or identifying a user.

The processor 130 may control the overall operation of the electronic apparatus 100".

Referring to FIG. 9, the processor 130 may include a ROM 131, a RAM 132, a CPU 133, a graphic processing unit (GPU) 134, and first to nth interfaces 135-1 to 135-*n*. The ROM 131, the RAM 132, the CPU 133, the GPU 134, and first to nth interfaces 135-1 to 135-*n* may be connected to one another via a bus 136.

A command set, etc. for system botting may be stored in the ROM 131. The CPU 133 may copy the various programs stored in the storage 120 to the RAM 132, execute the program copied to the RAM 132, and perform various operations.

The CPU 133 may access the storage 120 and perform booting by using an operating system (O/S) stored in the storage 120. The CPU 133 may perform various operations by using various programs, contents, data, etc. stored in the storage 120.

The GPU 134 may perform graphic processing. The GPU 134 may generate a screen including various objects such as icons, images, texts, etc. by using a calculation unit (not shown) and a rendering unit (not shown). The calculation unit may calculate attribute values such as coordinate values, shapes, sizes, colors, etc. of the objects according to the layout of the screen. The rendering unit may generate screens of various layouts including objects based on the attribute values calculated by the calculation unit.

The first to nth interfaces 135-1 to 135-*n* may be connected to various constituent elements described above. One of the interfaces may be a network interface connected to an external device through a network.

Figure 10:
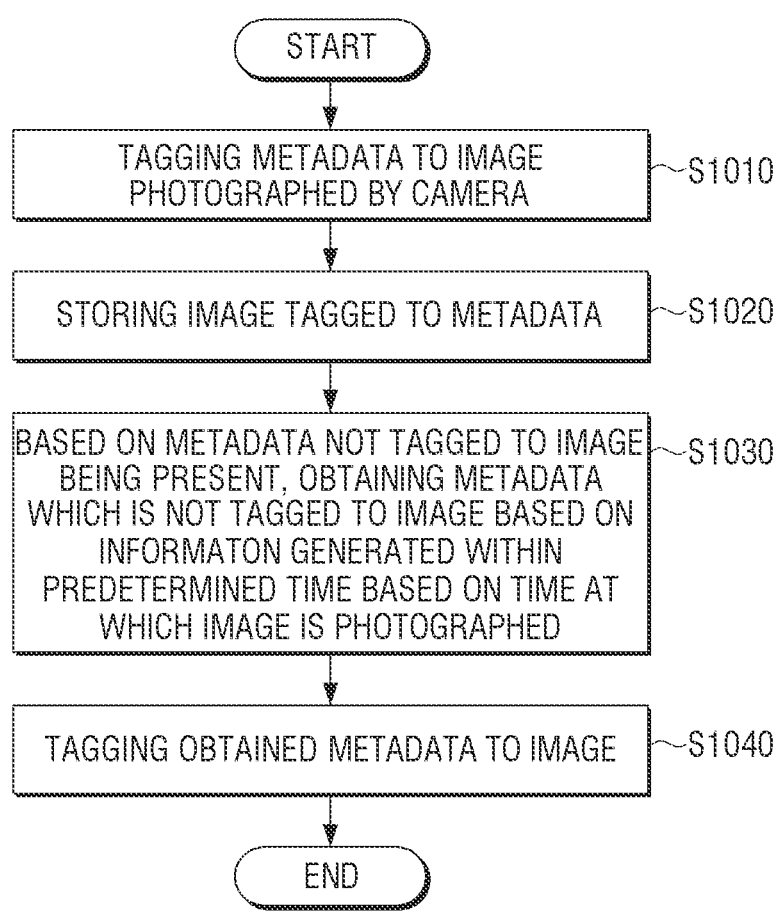
FIG. 10 is a flowchart to explain a controlling method of an electronic apparatus according to an embodiment of the disclosure.

FIG. 10 is a flowchart to explain a controlling method of an electronic apparatus according to an embodiment of the disclosure.

A first image photographed by a camera, and metadata of the first image may be stored at operation S1010. Examples of the metadata may be a shooting location, a shooting time, recognition data for the photographed object, etc.

It is identified whether first information related to the first image is obtainable at operation S1020.

When it is identified that the first information is not obtainable, based on second information, metadata related to the first information may be generated at operation S1030. The second image may include at least one other image photographed by a camera. The second information may include connection information between an electronic apparatus and an AP, payment information at a store, etc.

The generated metadata may be additionally stored as the metadata of the first image at operation S1040. The metadata related to the first information may be obtained from metadata of a second image, and based on the obtained metadata, the metadata related to the first information may be generated. To be specific, when the first information is related to the shooting location of the first image, based on the metadata of the first image, the shooting time of the first image may be identified, and when the identified shooting time is between respective shooting times of third and fourth images matched with each other, of the second image, the metadata related to the first information may be generated based on the respective shooting locations of the third and fourth images.

According to another embodiment, the metadata related to the first information of the first image may be generated by using the searched location of the AP based on the connection information of the AP connected to the electronic apparatus or the location of the store searched based on the payment information at the store, which is received from the external server, and the generated metadata may be stored as the metadata related to the first image.

Figure 11:
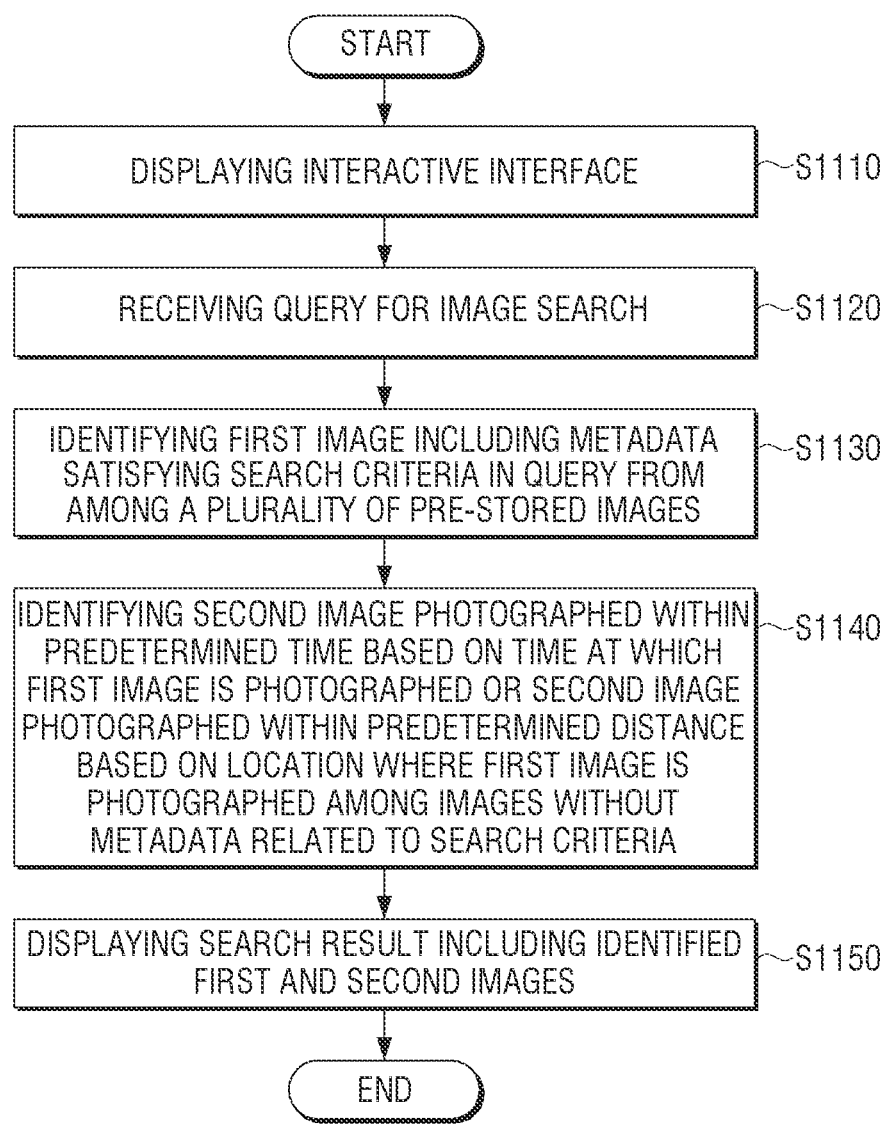
FIG. 11 is a flowchart to explain a controlling method of an electronic apparatus according to another embodiment of the disclosure.

FIG. 11 is a flowchart to explain a controlling method of an electronic apparatus according to another embodiment of the disclosure.

An interactive interface may be displayed at operation S1110.

A query for retrieving an image may be received at operation S1120.

A first image including metadata satisfying search criteria in the query may be identified from a plurality of pre-stored images at operation S1130.

A second image photographed within a predetermined time based on a time when the first image is photographed, or a second image photographed within a predetermined distance based on a location where the first image is photographed, among the images without metadata related to the search criteria may be identified at operation S1140. The metadata satisfying the search criteria may be stored as metadata of the identified second image.

A search result including the identified first and second images may be displayed at operation S1150. Based on the metadata of the identified first and second images, the identified first and second images may be classified into a plurality of categories, and a query message for selecting the classified category may be displayed.

Figure 12:
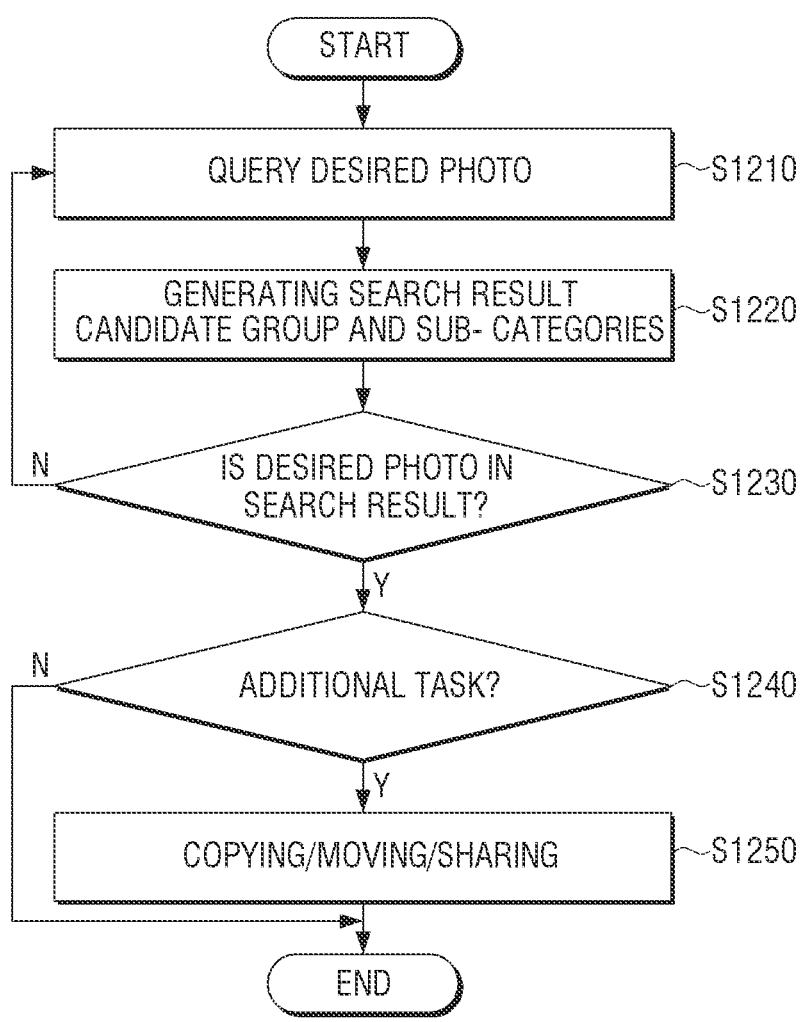
FIG. 12 is a flowchart to explain a method for providing a search result of a search interface according to an embodiment of the disclosure.

FIG. 12 is a flowchart to explain a method for providing a search result of a search interface according to an embodiment of the disclosure.

An interactive interface for retrieving an image may be displayed on a display of an electronic apparatus. A user may input a query for a photo to be retrieved at operation S1210.

When the query is input, by using metadata in the stored photo, a search result candidate group matched with the input query criteria and sub-categories for narrowing the search result may be generated and displayed at operation S1220.

When the query is output as to whether or not the photo the user wishes to find is included in the search result, and if a positive feedback is received from the user at operation S1230:Y, a query for an additional task for the photo selected by the user from among the search results may be output at operation S1240. If a negative feedback is received from the user at operation S1230:N, a query for the photo the user wishes to find may be output again.

As to the query for the additional task, if the user selects the additional task at operation S1240:Y, the additional task such as copying, moving, sharing, etc. may be further performed at operation S1250. If the user does not select the additional task at operation S1240:N, the additional task may not be performed, and the interactive interface may be terminated.

According to various embodiments, a user may search a desirable image with fewer clues more conveniently, and prevent an image to be searched from being omitted from a search result.

A method for controlling an electronic apparatus according to various embodiments may be embodied as a program and stored in various recording medium. In other words, a computer program processed by various processor and executing various controlling method may be stored.

There is provided a non-transitory computer readable medium that stores a program performing storing an image photographed by a camera, and metadata of the image, determining whether information related to the image is obtainable, and based on the first information not being obtainable, generating metadata related to the first information based on second information, and additionally storing the generated metadata as the metadata of the image.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

While the disclosure has been shown and described with reference to various embodiments thereof, it will be understood by those skilled in the art that various changes in form and details may be made therein without departing from the spirit and scope of the disclosure as defined by the appended claims as well as equivalents.

What is claimed is:

1. An electronic apparatus, comprising:
a display;
an input unit;
a storage; and
a processor configured to:
 display an interactive interface through the display,
 based on a query for retrieving an image being received through the input unit, identify a first image including metadata which satisfies search criteria in the query from a plurality of images stored in the storage,
 identify a second image photographed within a predetermined time based on a time when the first image is photographed, or a second image photographed within a predetermined distance based on a location where the first image is photographed among images without metadata related to the search criteria,
 control the display to display a search result including the identified first and second images, and
 store the metadata which satisfies the search criteria as metadata of the identified second image.

2. The electronic apparatus of claim 1, wherein the processor is further configured to:
classify the identified first and second images into a plurality of categories based on metadata of the identified first and second images, and
control the display to display a query message for selecting the plurality of classified categories.

3. The electronic apparatus of claim 1, wherein the processor is further configured to:
display a prompt to a user to identify a task associated with the identified second image.

4. The electronic apparatus of claim 3, wherein the processor is further configured to:
display a user interface for performing the task associated with the identified second image.

5. The electronic apparatus of claim 3, wherein the task associated with the identified second image comprises one of sharing the identified second image, copying the identified second image, or editing the identified second image.

* * * * *